United States Patent

[11] 3,575,004

[72] Inventors Bernard J. Gachne
 320 E. Sixth St.;
 Harlan R. Carlson, 815 Meeker St., Fort Morgan, Colo. 80701
[21] Appl. No. 784,033
[22] Filed Dec. 16, 1968
[45] Patented Apr. 13, 1971

[54] SIPHON TUBE CONTROL DEVICE AND SYSTEM
 16 Claims, 8 Drawing Figs.
[52] U.S. Cl. .................................................. 61/18, 137/132
[51] Int. Cl. ....................................................... E02b 08/06
[50] Field of Search ........................................ 61/10, 12, 16, 17, 18; 137/132, 135; 4/(Inquired); 138/(Inquired)

[56] References Cited
UNITED STATES PATENTS
301,391 7/1884 Reinecke..................... 137/135
1,241,916 10/1917 Brown......................... 61/124
1,250,023 12/1917 Rudolph....................... 137/135
1,770,340 7/1930 Lawaczeck.................. 61/18
2,345,466 3/1944 Dias............................ 61/12

Primary Examiner—Peter M. Caun
Attorney—Ancel W. Lewis, Jr.

ABSTRACT: A control device for a siphon tube regulates the liquid flow through the tube to provide self-priming for the tube and a level control for the liquid supply to the tube. The device includes a valve at the tube outlet and a valve actuating mechanism constructed and arranged to change the valve setting in response to a predetermined liquid level at the tube inlet for alternately stopping and starting the liquid flow through the tube. When a lower liquid level at the tube inlet is reached, the valve is moved to stop the flow and trap a column of liquid in the tube and the valve is moved to release the column to prime the tube at a higher liquid level at the tube inlet to start the flow through the tube.

Patented April 13, 1971
3,575,004
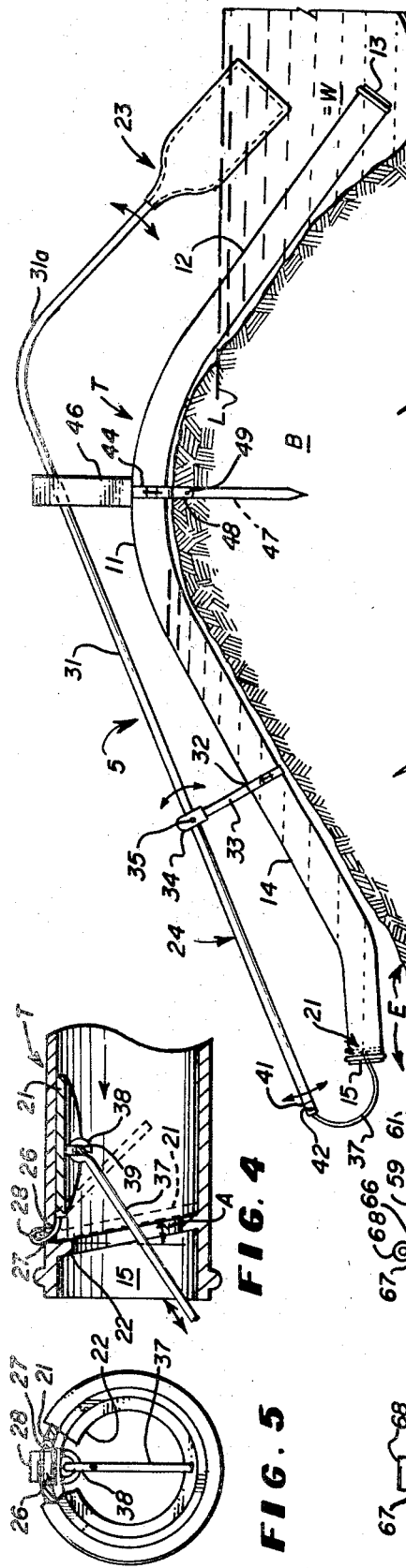
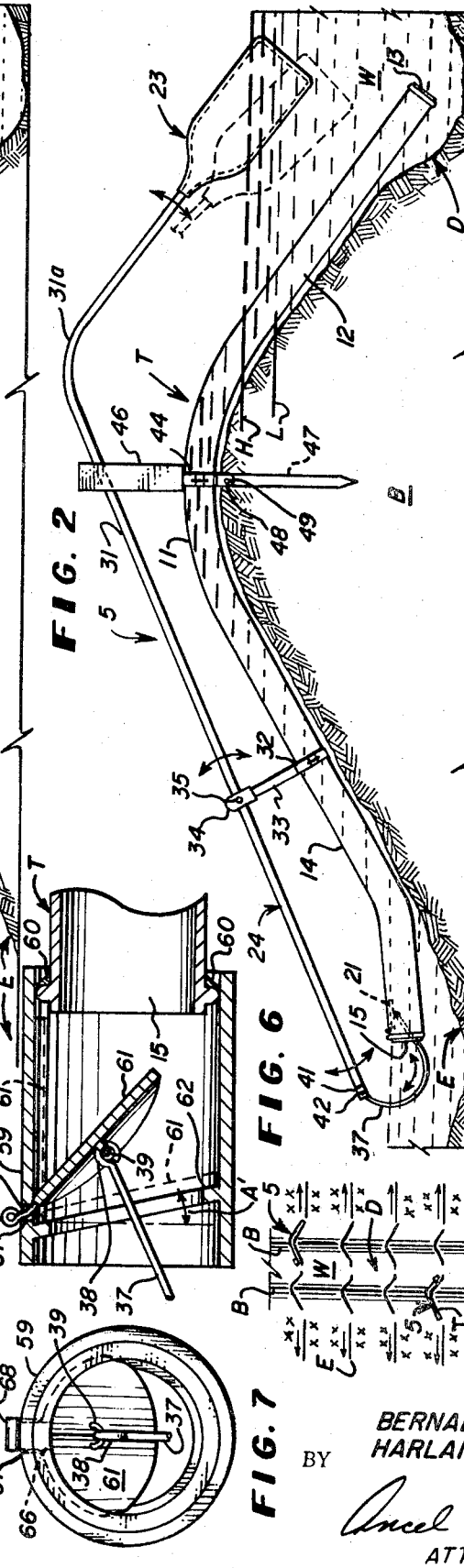
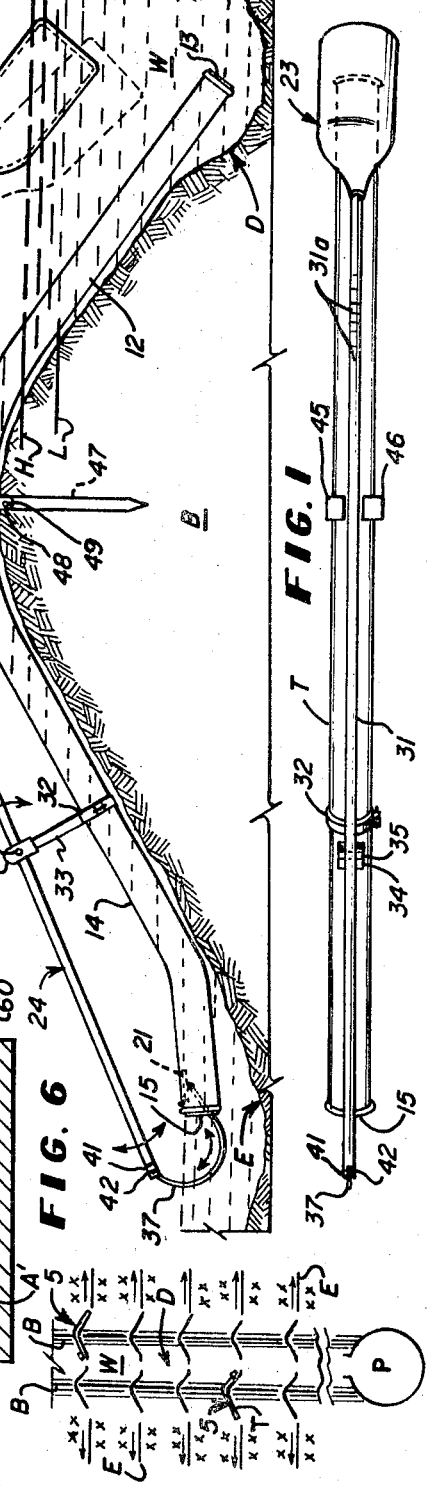
INVENTORS
BERNARD J. GACHNE
HARLAN R. CARLSON
BY
*Ancel W. Lewis Jr.*
ATTORNEY

SIPHON TUBE CONTROL DEVICE AND SYSTEM

SPECIFICATION

This invention relates to a novel control device for a siphon tube capable of automatically priming the tube and regulating the level of the liquid supply to the tube.

The term "siphon" or "siphon tube" is usually understood to refer to a length of tubing or conduit which is bent along its length to provide an upward and downward sweep and may be used to carry water or other liquid from a reservoir over an intervening wall or bank. Siphon tubes which are commonly in use in agricultural areas for irrigation are furnished in a variety of diameters for different transfer capacity requirements. It is the usual practice to locate a plurality of these tubes in a spaced relationship to both sides of a main reservoir or ditch to transfer water to ditches along the crop rows arranged laterally of the main ditch.

Siphon tubes are basically a static device with a fixed transfer capacity. Once the liquid head or liquid level at the inlet of the siphon tube drops too far the siphon action will break and upon a resumption of the water level it will not draw water until the tube is primed by exhausting the air in the tube. This priming, in irrigation practice, has been done manually by first filling or partially filling the tube with water and then placing it in position across the ditch bank with its inlet in the ditch water.

The water level in an irrigation ditch fluctuates considerably and will frequently lower too far and break the siphon action in the siphon tube. For example, the use of too many tubes for the available water supply or a fluctuating water supply such as when the water is furnished from a river or stream will result in a lower level and a break in the siphon action. A common occurrence in agricultural areas is a power failure which will shut off the pump delivering water to the ditch or reservoir. Consequently, present irrigation practices using siphon tubes require that a person always be available to check the siphon tubes and manually prime them once the siphon action breaks. If this is not done within a reasonable time the ditch will usually overflow causing damage both to crops and ditches.

Accordingly, it is an object of this invention to provide a simple, durable and reliable control device for a siphon tube capable of automatically priming the siphon tube after it has been set in operation.

Another object of this invention is to provide an automatic control device for a siphon tube which is easily adapted to a variety of shapes and sizes of commercially available irrigation siphon tubes.

It is still a further object of this invention to provide a new and improved device and system for regulating the water level in a reservoir or ditch from which water is being transferred by one or more siphon tubes such as an irrigation ditch.

In accordance with the present invention there is provided a valve operatively associated with the outlet of a siphon tube for regulating the liquid flow through the tube and a level sensing mechanism operatively coupled with the valve to change the valve setting in response to particular liquid levels at the tube inlet. The valve stops the flow through the tube when the liquid drops to a lower level and traps and holds a column of liquid in the tube above the outlet. This column is released by the valve when higher liquid level at the tube inlet is resumed resulting in the priming of the tube. This device also regulates the liquid supply level since the opening at a higher level tends to reduce the liquid level at the tube inlet. We have found that a simple and particularly effective control device may be provided in the form of a flaplike member and flange downstream of the flaplike member located just inside the outlet end of the tube or inside a tubular housing which is mounted on the outlet end of the tube and is effective in regulating the flow. This flaplike member is coupled by linkage means to a movable float positioned at the inlet of the tube. The combined forces of the liquid flow through the tube against the flaplike member as it pivots away from the flow and the downward movement of the float are particularly effective in quickly closing the flaplike member and trapping a column of liquid in the tube. The weight of the float and water column hold the flaplike member in a closed position until the liquid resumes a higher level, whereupon it is snapped to an open position by the upward force of the water against the float.

Other objects, advantages and capabilities of the present invention will become more apparent as the description proceeds taken in conjunction with the accompanying drawings, in which:

FIG. 1 is a side elevation view of a control device and siphon tube assembly embodying features of the present invention with a siphon tube being shown as disposed in a typical operative position across a water filled irrigation ditch; the valve in the tube being open and water flowing through the tube in a siphon action.

FIG. 2 is a side elevation view of the control device and siphon tube assembly shown in FIG. 1 in which the water level has dropped to a lower level with the valve being closed and a column of water trapped in the outlet leg of the tube.

FIG. 3 is a top plan view of the control device and siphon tube assembly shown in FIGS. 1 and 2.

FIG. 4 is an enlarged sectional view of the outlet end portion of the siphon tube showing the location of the flaplike member inside the tube in the open position with an intermediate position and the closed position being shown in dashed lines.

FIG. 5 is an end elevation view of the outlet end of the tube shown in FIG. 4 partially broken away to show the flaplike member in an open position as viewed from the outlet end.

FIG. 6 is an enlarged fragmentary sectional view of an alternative form of a valve assembly shown as a tubular valve housing mounted over the outlet end portion of the siphon tube and with the flaplike member being shown at an intermediate position just prior to being moved to the closed position.

FIG. 7 is an end elevation view of the valve assembly of FIG. 6 as viewed from the outlet end; and FIG. 8 is a top plan schematic diagram showing a typical pump filled irrigation ditch having a series of siphon tubes on the opposite banks of the ditch to transfer water from the ditch to lateral ditches adjoining the crops with one of the siphon tube control devices on each side of the ditch to depict a water level control system embodying features of the present invention.

Referring now to the drawings, typically an irrigation siphon tube T is shown as disposed on an irrigation ditch bank B in an operative manner so that it will transfer water W from a main supply ditch D to adjoining or lateral ditch E which extends along the crop row. The control device for the tube will be described in connection with a siphon tube T and an irrigation ditch but it is understood that the ditch may take various forms and that the present invention may be applied to the transfer of a variety of liquids in a siphon tube from filled reservoirs of many types to an adjoining point of use.

The siphon tube T is bent along its length and has an intermediate summit or apex 11, an inlet leg 12 which extends along the inner side of the ditch bank and terminates in an inlet 13 at one end of the tube and an outlet leg 14 on the other side of the summit which extends on the other side of the ditch bank and terminates in an outlet 15 at the other open end. The usual practice is to dispose the inlets and outlets of the tube a significant distance above the bottoms of the ditches as shown to avoid clogging or the like. Siphon tubes for irrigation useage are furnished commercially in different diameters to accommodate the water available and the volume required by the crops at their particular location.

The control device shown in FIGS. 1 to 8 operatively associated with the siphon tube T is generally designated by numeral 5 and basically includes a valve at the outlet of a tube which in the form shown in a flaplike member 21 hingedly mounted inside the tube outlet and an internal annular flange 22 downstream of the flaplike member together with an actuating mechanism for the valve which includes a float member 23 disposed in the water W above the tube inlet 13 and a linkage assembly 24 connected between the float and valve for pivoting the flaplike member in accordance with the changes in the liquid level of the water W in the ditch D to open and close the valve.

The details of the valve shown are more fully illustrated in FIGS. 4 and 5 wherein the flaplike member 21 is generally thin in cross section and is generally circular in shape to conform to the interior cross section of the tube, and has an upstanding tab portion or small projection 26 along its upper edge which extends through a narrow slot 27 in the top of the tube and curls over back against itself to form a head 28 outside the tube so as to hingedly support the flaplike member 21 for pivotal movement in the tube. The flaplike member 21 is preferably bent or bowed inwardly across its width so as to conform to or fit the annular contour of the inside of the tube when pivoted to a position generally parallel and in contact with the curved inside surface of the tube as shown. In this position the flaplike member affords a minimum area of contact with the liquid flow through the tube. At this location the tube will conduct a liquid flow therethrough in a siphon action. The annular flange 22 is also bowed or bent inwardly to conform to the bow or bend of the flaplike member and extends inwardly from the inside surface of the tube to define a port of lesser cross section than the tube; the area of the flaplike member being greater than the port so as to overlap the flange which defines an inside surface against which the flaplike member 21 is held as shown in dash lines to close the tube passage and stop the flow therethrough. In the closed valve position as shown in FIG. 2 the outlet end of the flaplike member is in direct contact with the angularly disposed flange member 22 and seals the outlet of the tube to hold a column of water in the outlet leg 14. The flaplike member 21 and flange 22 may be yieldable or provided and formed of materials or have coatings which will provide a good sealing contact between the abutting surfaces so as to hold the trapped column of water in the outlet leg of the tube. The flange 22 as shown in FIGS. 4 and 5 is inclined inwardly at an angle with a line normal or perpendicular to the flow passage of the tube designated A which is preferably on the order of 15° so that the range of pivotal movement of the flaplike member is less than 90°. This inclined arrangement has been found to provide a better valve response to liquid level and closer level regulation.

The linkage assembly 24 includes an elongated rocker arm 31 shown as supported in a spaced relation above the tube T and held by a pivotal support member including a clamp portion 32 preferably removably attached to the outlet leg of the tube, an upstanding rod portion 33 extending above the clamped portion and a clevis portion 34 with a slot at its upper end into which the arm 31 is slidably inserted. The arm 31 is pivotally secured thereto by a pin 35 which extends through an aperture in the arm and the clevis 34. In this manner the arm 31 will pivot or rock up and down at its ends as indicated by arrows. The arm 31 is bowed or bent along its length with a bend 31a above and rearwardly of the tube apex and has a float member 23 mounted on the rearward end of the arm and extending beyond the arm so that the float member is generally above the inlet of the tube.

An arcuate link 37 is mounted at the downstream end of the rocker arm 31 which is opposite from the float and is curved to extend downwardly and inwardly from this end. This link 37 is provided with a loop 38 at its inner end which is arranged to connect with a loop 39 on the flap 21. The link 37 is shown as having an upper end which fits into a clevis portion 41 formed on the end of the arm 31 and is pivotally secured to the arm by a pin 42 which extends through the clevis portion 41. This arrangement provides an in-and-out swinging movement of the link as the arm 31 moves up and down in response to the buoyance of the float on the water.

There also is provided a guide assembly mounted at the apex of the tube which includes a clamp portion 44 like portion 32 of the pivot which is preferably removably secured to the tube and upright spaces guide bars 45 and 46 on each side of the arm which define a slot through which the arm 31 will freely move but which limits the sideways or lateral movement to assist in its support on the tube.

There is also provided a stake or spike 47 which is secured to the tube and driven into the ditch bank B to support the entire assembly in an upright manner on the ditch bank. The preferred arrangement is to detachably connect the spike 47 to the tube so that the stake may be first driven into the bank followed by the securing of the tube and control device assembly thereon. Advantageously, this allows the tube to be initially primed by placing it in the ditch and filling it with water and then securing it to the stake 47. The removable mounting of the stake may take various forms and as shown is provided by a clevis portion 48 depending from the clamp portion 44 like that of the pivot 34 with an aperture in the stake through which a removable pin 49 may extend. From the foregoing it is apparent that each of the parts shown which make up the control device may be simple in construction and may be easily mounted and demounted on the conventional siphon tube.

An alternative to the valve arrangement wherein the tube forms the valve housing is shown in FIGS. 6 and 7. This alternate valve assembly includes a short length of tubing or a tubular body 59 forming the valve housing which is slidably inserted onto the outlet end of the tube T and secured thereto as by a weld 60. The general construction of this valve is the same as that shown in FIGS. 4 and 5 but completely independent of the tube and advantageously may be easily attached to the tube T by sliding it over the tube in a telescoping relation. A flaplike member 61 is hingedly supported in the housing 59 and includes an upstanding tab portion 66 which extends through a narrow slot 67 in the top of the tube and curls over back against itself to form a head 68. Again the flaplike member 61 is bowed inwardly across its width to conform to or fit the inner annular contour of the inside of the tube and when pivoted to the upper position so that it conforms to the shape of the tube. The annular flange 62 inside the tube is also inclined inwardly at an angle to a line normal to the passage on the order of 15° designated A'. The area of the outlet port formed by the annular flange 62 in this arrangement is at least as great as or greater than that of the siphon tube T so that the valve assembly will not impeded the volume of liquid flow through the tube T.

The general sequence of operation will now be described with reference to FIGS. 1 and 2. The siphon tube T having the control device 5 mounted thereon is initially primed by removing it from the stake 47 and filling the tube with water. It is then placed across the ditch in a manner to start the flow through the tube and attach it to the stake so that it will be supported in an upright manner as shown. The tube will then transfer water in a siphon action from ditch D to ditch E. A high water level selected for discussion purposes and designated H in FIG. 1 will buoy the float 23 up and through the linkage assembly the flaplike member is moved generally parallel with the inside of the tube in the fully open position shown in FIG. 4.

As frequently occurs in irrigation ditches, a condition will occur such that the water level in the ditch will drop significantly causing the flap 23 to gradually lower and this causes the flap to gradually pivot downwardly such as to the intermediate position shown in dashed lines in FIG. 4. As the flaplike member moves from its fully open position it is apparent that the flow of the liquid through the tube will progressively contact a greater surface area of the flaplike member and thereby tend to exert a force on the flaplike member toward the closed position, so that there are the combined forces of the water on the float and the water flow against the flaplike member which tend to close the valve. When the float member 23 reaches level L the flaplike member will suddenly snap shut. Throughout the movement of member 21 the siphon action is still taking place with a slight impeding of the flow and when the flaplike member is finally closed a significant column of water will be trapped in the outlet leg of the tube as depicted in FIG. 2. With the valve in the closed position it can be seen that the weight of the column of water will also tend to hold it in that closed position. This closed condition is also maintained by the weight of the float at the end of the arm 31 and which will keep the valve closed even when the ditch is completely empty. Eventually, the water source or supply to the ditch will be corrected and the water level in the ditch will then again rise until it resumes the higher level H, at which time the valve opens. This opening is produced by having float member 23 rise with the increased water level to pivot the rocker arm 31 down at its discharge end and swing the flaplike member inwardly so that when the force is sufficient to overcome the pressure exerted by the column of water against the flaplike member it will suddenly snap open. This quick opening of the flaplike member suddenly releases the column of water to flow through the outlet of the siphon tube and the decrease in pressure inside the tube which will in effect prime or exhaust the tube and cause the flow to restart through the tube. This cycle will repeat to automatically prime the tube each time the water level lowers below level L and then resumes the higher level H. The levels H and L are selected for illustration purposes only and may vary according to particular level requirements. It is apparent that if the arm 31 is of a pliable metal rod it may be bent or bowed in either direction to change the point at which the valve will open or close to afford a range of adjustability to the control device.

The schematic system shown in FIG. 8 depicts a main irrigation ditch D furnished water by a pump P having a series of conventional siphon tubes T arranged in a spaced relation to deliver water W from the ditch D to lateral ditches E located on each side. A siphon tube control device 5 is mounted on a tube T on each side of the ditch. These control devices may be used to control the level of the water in the main ditch because they will operate in the manner as above described when the water reaches a higher level H and turn off at a lower level L which will serve to regulate the upper level of the water in the ditch and also the volume of water in the main ditch D. It is therefore that such a regulation of the flow in the siphon tubes will serve to avoid crop and ditch wash outs due to fluctuations in the water to the main ditches heretofore not available with the conventional siphon tube systems.

Although the present invention has been described with a certain degree of particularity, it is understood that the present invention disclosure has been made only by way of example and that changes in details of structure and system components may be made without departing from the spirit thereof.

We claim:

1. A control device for a siphon tube having an inlet and outlet at opposite ends and adapted to be disposed with the inlet in a liquid to be drawn through the tube in a siphon action, said device comprising a valve at the outlet end of the tube for regulating the liquid outflow from the tube, the valve being arranged so that the flowing liquid within the tube adjacent the outlet acts to close the valve, and float actuating means operatively associated with said valve for moving the valve in response to the liquid level at the tube inlet, said valve being opened at a predetermined upper liquid level to permit liquid flow therethrough by the float actuating means and closed at a predetermined lower liquid level by the action of the liquid flow within the tube to trap a column of liquid in the tube above the valve and tube outlet so that when said upper level is restored the valve is opened and said column primes the tube by gravity flow therethrough.

2. A control device as set forth in claim 1 wherein said valve includes a flaplike member hingedly supported from the tube in contact with the liquid flow within the tube.

3. A control device as set forth in claim 2 wherein said valve includes an internal annular flange portion downstream of the flaplike member defining a valve port against which the flaplike member is moved in the closed position with the weight of the column of water acting on the flaplike member to hold the flaplike member against the flange portion to provide a positive seal.

4. A control device as set forth in claim 2 wherein said flaplike member is hingedly supported inside the outer end portion of the tube.

5. A control device as set forth in claim 2 wherein said flaplike member is hingedly supported inside a tubular valve housing attached to the outlet end portion of the tube arranged in flow communication with the tube.

6. A control device for a siphon tube as set forth in claim 3 wherein said flaplike member is pivoted by said actuating means as the liquid level raises to an upper, open position generally parallel with the inside of the flow passage of the tube to provide a minimum area of contact with the liquid flow therethrough.

7. A control device as set forth in claim 3 wherein said flaplike member is pivoted downwardly and away from said open position by said float actuating means as the liquid level lowers progressively increasing its area of contact with the liquid flow therethrough.

8. A control device as set forth in claim 7 wherein said flaplike member moved to the closed position when the area of contact of said flaplike member with said liquid flow is sufficient to snap it against said flange portion.

9. A control device as set forth in claim 3 wherein said flangelike portion is inclined inwardly at an angle with a line normal to the flow passage of the tube.

10. A self-priming, siphon tube and liquid level control assembly comprising, in combination, a siphon tube having an inlet and outlet at opposite ends adapted to be disposed with its inlet in a liquid to be drawn therethrough in a siphon action, a valve mounted at the outlet end of the tube for regulating a liquid outflow through the tube, said valve including a flaplike member arranged in contact with the liquid flow within the tube and adapted to pivot so as to move between open and closed positions with the valve being arranged so that the flowing liquid within the tube adjacent the outlet acts to close the valve, and an actuating mechanism for the valve mounted on the tube for transport therewith, said actuating mechanism including a float at the tube inlet and a linkage member coupled between the float and flap member to translate the up and down motion of the float to an in and out motion to pivot the flaplike member, said flaplike member being moved to an open position when the liquid level at the tube inlet is at a predetermined upper level for liquid transfer therethrough and to a closed position at a preselected lower level by the action of the liquid flow within the tube prior to the breaking of the siphon action through the tube to trap a column of water in the tube above the valve and tube outlet so that when the upper liquid level is restored the flaplike member is moved to the open position and the column primes the tube by gravity flow therethrough.

11. A self-priming siphon tube and liquid level control assembly as set forth in claim 10 wherein said linkage member includes an elongated arm pivotally supported from the tube for an up and down rocking motion at each end thereof, said arm having the float member at one end above the tube inlet.

12. A self-priming siphon tube and liquid level control assembly as set forth in claim 10 wherein said tube has a guide member extending upwardly from the tube to prevent lateral swinging of said arm during its rocking movement.

13. A self-priming siphon tube and liquid level control assembly as set forth in claim 10 wherein said tube has means for detachably mounting the tube to a stake arranged to be driven into the ditch for supporting the tube in an upright manner on the ditch.

14. The combination with a siphon tube having an inlet and outlet arranged to transfer liquid through the tube in a siphon action, an automatic priming device for the tube comprising a valve at the outlet end of the tube for regulating the liquid flow through the tube, the valve being arranged so that the liquid flow within the tube adjacent the tube outlet acts to close the valve, and a liquid level sensing means adjacent the inlet operatively coupled with said valve to move the valve toward a closed position with the outflowing liquid from the tube being used to snap-close said valve when the water reaches a preselected lower level prior to the breaking of a siphon action to trap a column of liquid in the tube above said tube outlet and valve and open said valve to release the column when the liquid rises to a predetermined level to prime the tube and start the flow through the tube.

15. An automatic siphon tube level control device for a reservoir subject to being filled by a water supply comprising a siphon tube adapted to be disposed with the inlet in the water contained by the reservoir and an outlet extending outside the reservoir to draw water from the reservoir in a siphon action, a valve at the outlet end of the tube for regulating the liquid flow through the tube, the valve being arranged so that the liquid flowing within the tube acts to close the valve, and a level sensing, valve-actuating mechanism coupled to the valve to move the valve toward the closed position with the liquid flowing from the tube being used to close the valve to stop the flow through the siphon tube when the water level drops to a lower level to restart the flow in the tube when the water level rises to a higher level so as to maintain the water level between said higher and lower levels.

16. A siphon tube level control system for a reservoir having a fluctuating water supply such as an irrigation ditch comprising a plurality of siphon tubes arranged along the bank of the reservoir, selected ones of said tubes having an inlet extending into the water in the reservoir and an outlet extending outside the reservoir and leading to a runoff area along said irrigation ditch to draw the water from the reservoir in a siphon action, float-controlled valve means associated with said ones of said siphon tubes including a valve member at the outlet of each of said ones of said tubes responsive to the water level in the reservoir to stop the flow through said ones of said siphon tubes when the water level in the reservoir drops to a preselected lower level and to automatically open the valve members and restart the siphon action in said ones of said tubes each time the water level rises to a preselected higher level to maintain the water in the reservoir between said upper and lower levels.